US010184456B2

(12) United States Patent
Liu et al.

(10) Patent No.: US 10,184,456 B2
(45) Date of Patent: Jan. 22, 2019

(54) WIND TURBINE AND BLADE ALIGNMENT METHOD THEREOF

(71) Applicant: General Electric Company, Schenectady, NY (US)

(72) Inventors: Xiaoming Liu, Shanghai (CN); Xu Fu, Shanghai (CN); Bruce Clark Busbey, Greenville, SC (US); Rong Li, Shanghai (CN); Amir Riahi, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 694 days.

(21) Appl. No.: 14/706,088

(22) Filed: May 7, 2015

(65) Prior Publication Data
US 2015/0330364 A1 Nov. 19, 2015

(30) Foreign Application Priority Data
May 13, 2014 (CN) .......................... 2014 1 0200593

(51) Int. Cl.
*F03D 1/06* (2006.01)
*F03D 17/00* (2016.01)
*F03D 7/04* (2006.01)
*F03D 13/10* (2016.01)

(52) U.S. Cl.
CPC ........... *F03D 17/00* (2016.05); *F03D 1/0658* (2013.01); *F03D 1/0675* (2013.01); *F03D 7/042* (2013.01); *F03D 13/10* (2016.05); *F05B 2260/83* (2013.01); *Y02E 10/721* (2013.01)

(58) Field of Classification Search
CPC ........ F03D 17/00; F03D 13/10; F03D 1/0675; F03D 1/0658; F03D 7/042; F05B 2260/83; Y02E 10/721
See application file for complete search history.

(56) References Cited

U.S. PATENT DOCUMENTS 5,865,599 A * 2/1999 Pruden .................... B64C 11/30
324/207.22
6,213,713 B1 * 4/2001 Dickmann ............... B63H 3/00
416/61

(Continued)

FOREIGN PATENT DOCUMENTS

CN 101821496 A 9/2010
CN 102797634 A 11/2012

(Continued)

OTHER PUBLICATIONS

Machine Translation and First Office Action and Search issued in connection with corresponding CN Application No. 201410200593.6 dated Jul. 27, 2017.

*Primary Examiner* — Eldon Brockman
(74) *Attorney, Agent, or Firm* — GE Global Patent Operation; Douglas D. Zhang

(57) ABSTRACT

The present subject matter is directed to a wind turbine blade alignment method. A sensor provided on the blade at a blade station with a known twist angle is used to measure an installation angle of the blade station. The installation angle is adjusted if the installation angle measured by the sensor is not equal to the known twist angle. A wind turbine with such a sensor for measuring an installation angle used for blade alignment is also provided.

19 Claims, 4 Drawing Sheets

(56) References Cited

U.S. PATENT DOCUMENTS

| | | | |
|---|---|---|---|
| 9,033,663 B2* | 5/2015 | Danielsen | F03D 1/0658 |
| | | | 416/61 |
| 9,366,230 B2* | 6/2016 | Perley | F03D 7/042 |
| 9,528,494 B2* | 12/2016 | Gao | F03D 7/0224 |
| 9,624,905 B2* | 4/2017 | Perley | F03D 7/0292 |
| 9,810,200 B2* | 11/2017 | Odgaard | F03D 7/0224 |
| 2004/0253114 A1* | 12/2004 | Gunneskov | F03D 1/065 |
| | | | 416/224 |
| 2010/0232963 A1* | 9/2010 | Volanthen | F03D 1/065 |
| | | | 416/146 R |
| 2011/0227342 A1* | 9/2011 | Danielsen | F03D 1/0658 |
| | | | 290/44 |
| 2012/0303277 A1* | 11/2012 | Fu | F03D 17/00 |
| | | | 702/3 |
| 2013/0230400 A1* | 9/2013 | Gao | F03D 7/0224 |
| | | | 416/1 |
| 2014/0241878 A1* | 8/2014 | Herrig | F03D 7/0224 |
| | | | 416/1 |
| 2014/0271181 A1* | 9/2014 | Perley | F03D 7/042 |
| | | | 416/1 |
| 2015/0078895 A1* | 3/2015 | Odgaard | F03D 7/0224 |
| | | | 416/1 |
| 2015/0086356 A1* | 3/2015 | Perley | F03D 7/0292 |
| | | | 416/1 |

FOREIGN PATENT DOCUMENTS

| | | |
|---|---|---|
| CN | 103423105 A | 12/2013 |
| CN | 103573552 A | 2/2014 |
| CN | 103711642 A | 4/2014 |
| CN | 104093546 A | 10/2014 |
| CN | 104454350 A | 3/2015 |
| CN | 104595112 A | 5/2015 |
| DE | 31 06 624 A1 | 9/1982 |
| EP | 1 612 413 B1 | 3/2015 |
| WO | 2013/110215 A1 | 8/2013 |

* cited by examiner

WIND TURBINE AND BLADE ALIGNMENT METHOD THEREOF

FIELD OF THE INVENTION

The present subject matter relates generally to wind turbines and, more particularly, to blade alignment methods for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, the rotor blades are mounted on a hub and aerodynamically interact with the wind. In order to improve efficiency for capturing the wind energy, it is usually needed to adjust blade pitch to a desired blade pitch angle after the blade is assembled to the hub. Currently, the alignment between the blade and hub is carried out by manually marking the blade and hub in factory and manually aligning the marks in the field where the wind turbine is mounted. However, the manual alignment may introduce high variance and high probability of errors. Misalignment may cause annual energy output (AEP) lost. For example, 3-degree deviation may cause 5% AEP loss. Moreover, misalignment may cause high turbine vibration, and cause un-symmetrical force and worsen working load to the turbine, which may generate damage and significantly reduce the service life of wind turbine components.

Accordingly, a new blade alignment method and a wind turbine which can align its blades with the method are desirable.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a wind turbine blade alignment method. In the method, an installation angle of a blade station with a known twist angle is measured by a sensor provided at the blade station. The measured installation angle is compared with the known twist angle, and the position of the blade is adjusted if the measured installation angle is not equal to the known twist angle, wherein the installation angle substantially equals to the known twist angle.

In another aspect, the present subject matter is directed to a wind turbine having a rotor including a blade, and a sensor for measuring an installation angle of a blade station, wherein the blade station has a known twist angle. The wind turbine further includes a controller having a processing unit for determining whether to adjust the installation angle of the blade station by comparing the installation angle measured by the sensor to the known twist angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
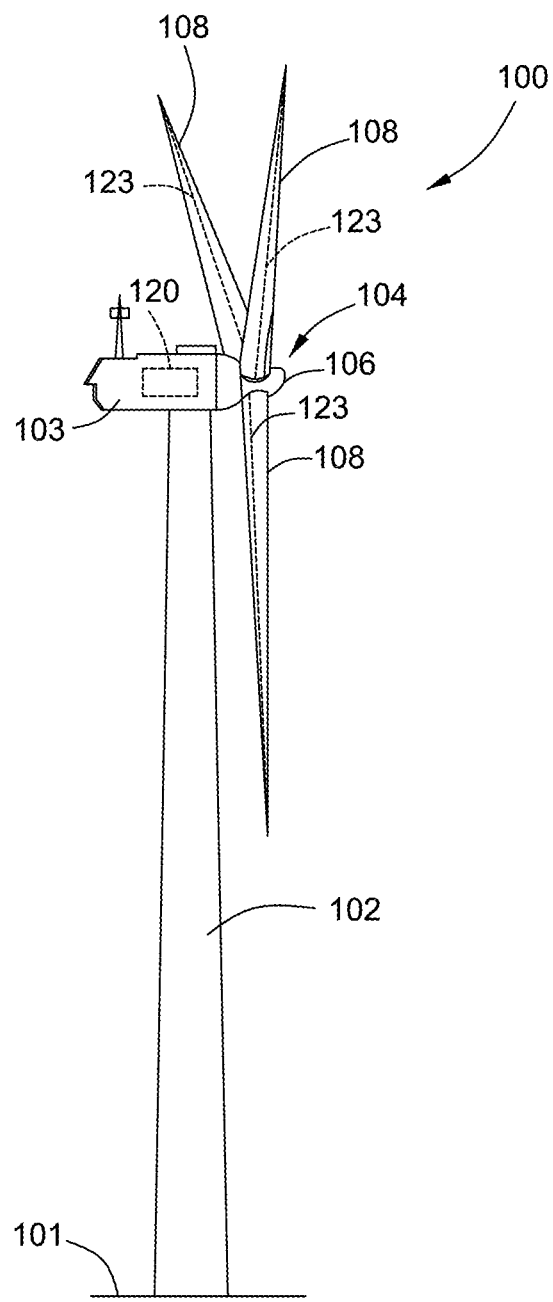
FIG. 1 illustrates a schematic perspective view of an exemplary wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to wind turbines with improved blade alignment capabilities as well as blade alignment methods. A sensor is provided (pre-embedded or assembled) in a wind turbine blade section, like a zero-twist blade station or any other positions with a known twist angle, which is known from design or simulation supposing that the blade is in an ideal twist alignment. The sensor, such as an angle sensor, optionally used with a calculation unit and method, is able to measure and obtain angle information of the location where it is installed. If the angle obtained by the sensor is equal to the known twist angle, it is indicated that the blade is well aligned.

Referring now to the drawings, FIG. 1 illustrates a perspective view of one embodiment of a wind turbine 100. As shown, the wind turbine 100 generally includes a tower 102 extending from a support surface 101, a nacelle 103 mounted on the tower 102, and a rotor 104 coupled to the nacelle 103. The rotor 104 includes a rotatable hub 106 and at least one rotor blade 108 coupled to and extending outwardly from the hub 106. For example, in the illustrated embodiment, the rotor 104 includes three rotor blades 108. However, in an alternative embodiment, the rotor 104 may include more or less than three rotor blades 108. Each rotor blade 108 may be spaced about the hub 106 to facilitate rotating the rotor 104 to enable kinetic energy to be transferred from the wind into usable mechanical energy, and subsequently, electrical energy. For instance, the hub 106 may be rotatably coupled to an electric generator (not shown) positioned within the nacelle 103 to permit electrical energy to be produced.

The wind turbine 100 may also include a wind turbine controller 120 centralized within the nacelle 103. However, in other embodiments, the controller 120 may be located within any other component of the wind turbine 100 or at a location outside the wind turbine. Further, the controller 120 may be communicatively coupled to any number of the components of the wind turbine 100 in order to control the operation of such components and/or to implement a control action. As such, the controller 120 may include a computer or other suitable processing unit. Thus, in several embodiments, the controller 120 may include suitable computer-readable instructions that, when implemented, configure the controller 120 to perform various different functions, such as receiving, transmitting and/or executing wind turbine control signals. Accordingly, the controller 120 may generally be configured to control the various operating modes of the wind turbine 100 (e.g., start-up or shut-down sequences), de-rate or up-rate the wind turbine 100, and/or control various components of the wind turbine 100. For example, the controller 120 may be configured to control the blade pitch or pitch angle of each of the rotor blades 108 (i.e., an angle that determines a perspective of the rotor blades 108 with respect to the direction of the wind) to control the power output generated by the wind turbine 100 by adjusting an angular position of at least one rotor blade 108 relative to the wind. For instance, the controller 120 may control the pitch angle of the rotor blades 108 by rotating the rotor blades 108 about a pitch axis 123, either individually or simultaneously, by transmitting suitable control signals to a pitch drive or pitch adjustment mechanism (not shown) of the wind turbine 100.

Figure 2:
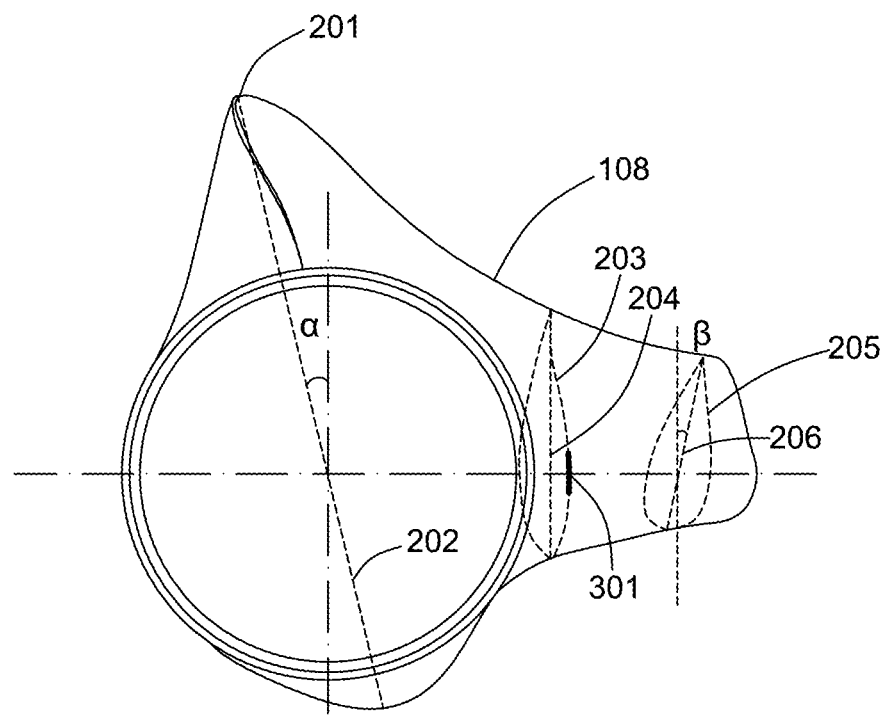
FIG. 2 illustrates an elevation view taken from a root end of a blade of the wind turbine of FIG. 1.

The blade profile includes a serial of cross sections with specified airfoil profile. To provide the best capture of wind energy, these cross sections may be put into a series with their chord line gradually twisted from the blade root to the blade tip, starting from a positive twist angle to a zero twist angle and further to a negative twist angle. For example, as illustrated in FIG. 2, which shows an elevation view of the blade 108 as an example taken from a root end of the blade 108, a root-adjacent blade station 201 has a chord line 202 with a positive twist angle α, a middle-around blade station 203 has a chord line 204 with zero twist angle, and a tip or tip-adjacent blade station 205 has a chord line 206 with negative twist angle β.

In order to regulate the power output of the wind turbine and the loads on the wind turbine components, the wind turbine blades have variable pitch, i.e. each blade 108 can be rotated around a pitch axis thereof (e.g., a longitudinal axis). It is important to adjust blade pitch accurately to a desired blade pitch angle in order to achieve proper operation of each blade and of the entire system, which is usually realized by aligning a blade chord line with an alignment reference on the hub. The blade station having a chord line with a zero twist angle is regarded as the zero twist station, and usually is used as the baseline for aligning the blade with the hub (although as mentioned above, any blade station with a known twist angle can be used as the baseline).

Figure 3:
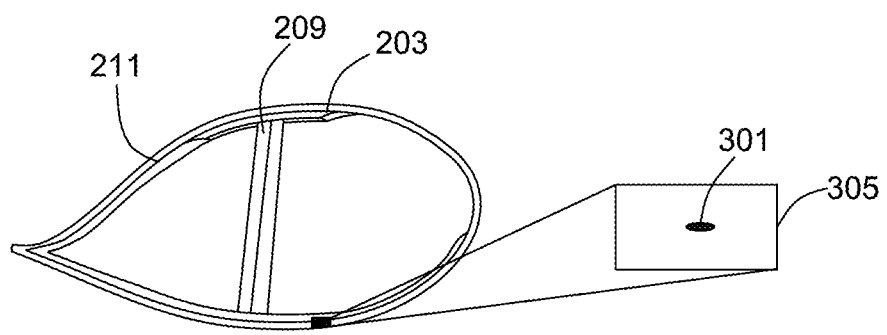
FIG. 3 is a cross-section view of the blade of FIG. 2, which shows an inner structure of a blade station.

As the blades 108 are large and the tower section 102 for installing the blades is tall in size, it is hard to make accurate blade alignment manually. As illustrated in FIGS. 2 and 3, a sensor 301 is provided at a blade station with a known twist angle, such as the zero twist station 203. The sensor alone or assisted by a processing unit of the controller 120, is capable of measuring an installation angle of the blade station where it is located. It may be a position sensor used to obtain position information, which can be processed to calculate the installation angle of the blade station, or an angle sensor that permits angle measurement. In a specific embodiment, the sensor is an angle sensor, such as a micro inertial measurement unit (MIMU). As used herein, "micro inertial measurement unit (MIMU)" refers to a motion capture sensing apparatus, which can sense three dimensional (3D) orientation (pitch, roll, yaw) signals, 3D acceleration signals, 3D rate of turn signals, 3D magnetic field signals, and/or other related parameter signals in real time. The MIMUs may include at least one of or any combination of a 3D accelerometer, a 3D gyroscope, and a 3D magnetometer.

The sensor may be provided before or after the blade is assembled to the hub. That is to say, the sensor may be embedded or pre-assembled to the blade before the blade is assembled to the hub, for example, during the manufacturing process of the blade, or attached to the blade after the blade is assembled to the hub but before conducting the blade alignment. The sensor may be located in any positions of the blade station where it is installed. For example, the sensor may be infused into or assembled to a skin, shear web or spar cap of the blade station. In the blade station 203 as illustrated in FIG. 3, the sensor may be attached to an inside skin of the blade station, or to a shear web 209 or spar cap 211 within the blade station 203. In a specific embodiment, the sensor 301 is embedded into a prefab block 305, which is infused into or assembled to the blade station 203.

The sensor may be wireless or comprise wires for power supply and signal transfer. In some embodiments, the sensor is wireless and comprises power battery and a wireless signal transfer device. In some embodiments, the sensor comprises power supply or/and signal transfer wires extending along a spar cap, a shear web or an inner skin of the blade.

In order to conduct blade alignment based on information obtained by the sensor, the controller 120 of the wind turbine 100 may include a processing unit configured to determine whether to adjust the installation angle of the blade station by comparing if the installation angle measured by the sensor is equal to the known twist angle. The processing unit may include a receiver for receiving the angle or position information sensed by the sensor. Moreover, the processing unit may further include a calculation unit for processing the angle or position information to calculate the installation angle of the blade station where the sensor is located. For example, if the sensor is a position sensor for measuring position information, the processing unit may include a calculation unit for processing the position information to calculate the installation angle of the blade station. The processing unit is programmed to cause the blade to rotate about its pitch axis if the installation angle measured by the sensor is not equal to the known twist angle, and stop rotating once the installation angle measured by the sensor is substantially equal to the known twist angle.

Figure 4:
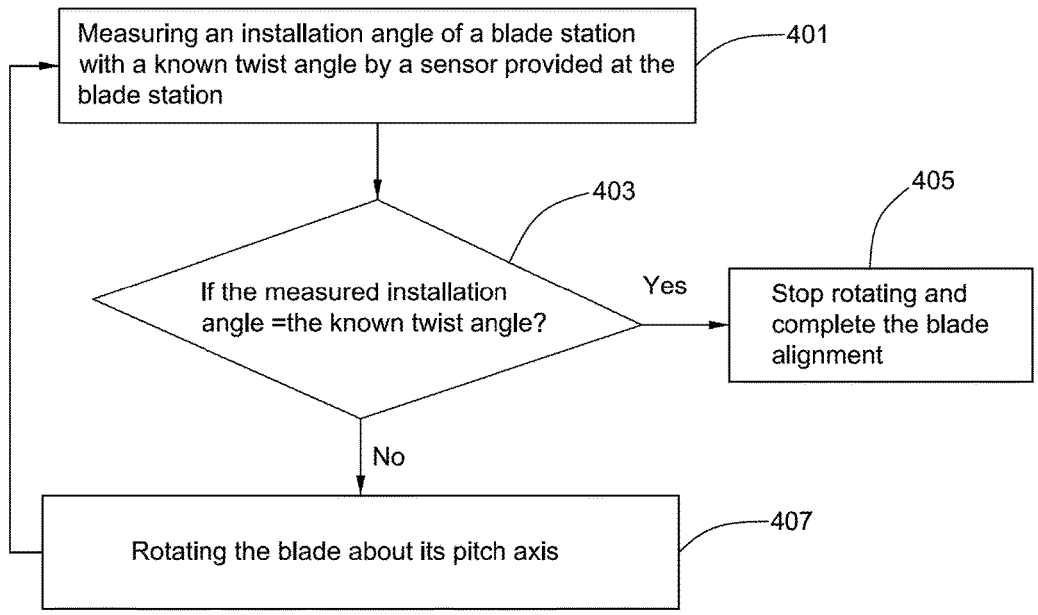
FIG. 4 is a flow chart illustrating an exemplary wind turbine blade alignment process.

Another aspect of the present disclosure relates to a wind turbine blade alignment method. In the method, an installation angle of a blade station with a known twist angle is measured by a sensor provided at the blade station. The installation angle is adjusted if the installation angle measured by the sensor is not equal to the known twist angle. As described above, the installation angle is adjusted by rotating the blade around its pitch axis. For example, in a method according to a specific embodiment as illustrated in FIG. 4, an installation angle of a blade station with a known twist angle is measured by a sensor provided at the blade station in step 401, and the measured installation angle is compared with the known twist angle in step 403. If the measured installation angle is not equal to the known twist angle, the blade is caused to rotate about its pitch axis in step 407. Once the measured installation angle is equal to the known twist angle, the blade is caused to stop rotating in step 405, and therefore the blade alignment is completed.

In some embodiments, before operating the sensor to measure an installation angle, the blade with the sensor is positioned to a certain location, for example, is positioned to make a longitudinal axis of the blade substantially in a vertical direction, which may be realized by rotating the rotor of the blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine blade alignment method comprising:
   measuring an installation angle of a blade station by a sensor provided at the blade station, wherein the blade station has a known twist angle;
   comparing the measured installation angle with the known twist angle; and
   adjusting the position of the blade until the measured installation angle is equal to the known twist angle.

2. The method according to claim 1, wherein the position of the blade is adjusted by rotating the blade around a pitch axis of the blade.

3. The method according to claim 1, further comprising positioning the blade to a certain location before using the sensor to measure the installation angle.

4. The method according to claim 1, wherein the sensor is positioned at a zero-twist station of the blade.

5. The method according to claim 1, wherein the sensor is a position sensor, and measuring an installation angle further comprises obtaining position information of the blade station by the position sensor and processing the position information to calculate the installation angle of the blade station.

6. The method according to claim 1, wherein the sensor is an angle sensor that permits direct angle measurement.

7. The method according to claim 6, wherein the angle sensor is a micro inertial measurement unit (MIMU) comprising at least one of or any combination of a 3D accelerometer, a 3D gyroscope, and a 3D magnetometer.

8. The method according to claim 1, wherein the sensor is infused into or assembled to a shear web or a spar cap of the blade station.

9. The method according to claim 1, wherein the sensor is embedded into a prefab block, which is infused into or assembled to the blade station.

10. The method according to claim 1, wherein the sensor is spanwisely remote from a root end of the blade.

11. A wind turbine comprising:
    a rotor comprising a blade;
    a sensor for measuring an installation angle of a blade station, wherein the blade station has a known twist angle; and
    a controller comprising a processing unit for determining whether to adjust the position of the blade by comparing the installation angle measured by the sensor to the known twist angle.

12. The wind turbine according to claim 11, wherein the controller is configured to adjust the position of the blade if the installation angle measured by the sensor is not equal to the known twist angle.

13. The wind turbine according to claim 11, wherein the blade station has a twist angle of about zero.

14. The wind turbine according to claim 11, wherein the sensor is a position sensor used to obtain position information, and the processing unit comprises a calculation unit for processing the position information to calculate the installation angle of the blade station.

15. The wind turbine according to claim 11, wherein the sensor is an angle sensor that permits direct angle measurement.

16. The wind turbine according to claim 15, wherein the angle sensor is a micro inertial measurement unit (MIMU) comprising at least one of or any combination of a 3D accelerometer, a 3D gyroscope, and a 3D magnetometer.

17. The wind turbine according to claim 11, wherein the sensor is infused into or assembled to a shear web or a spar cap of the blade station.

18. The wind turbine according to claim 11, wherein the sensor is embedded into a prefab block, which is infused into or assembled to the blade station.

19. The wind turbine according to claim 11, wherein the sensor is spanwisely remote from a root end of the blade.

\* \* \* \* \*